J. K. MAJOR.
NUT LOCK.
APPLICATION FILED NOV. 25, 1913.
1,142,345.
Patented June 8, 1915.
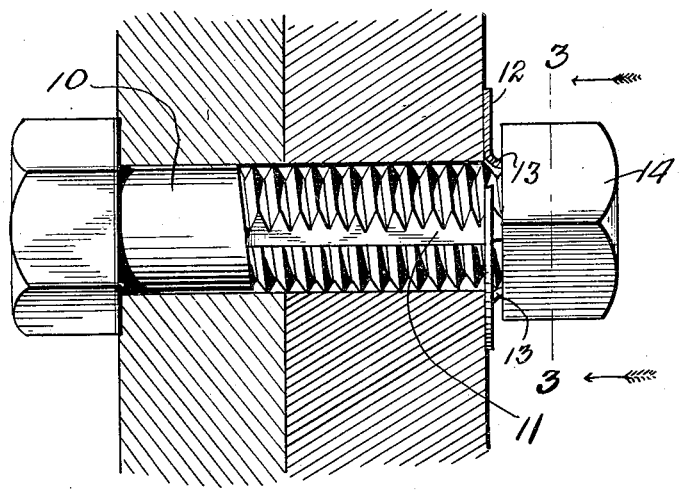
Fig. 1.
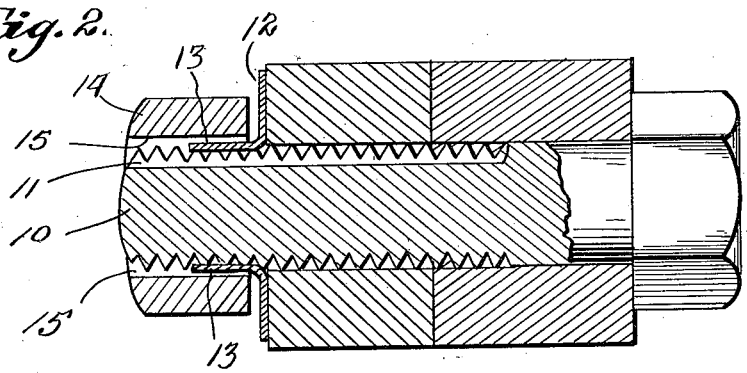
Fig. 2.
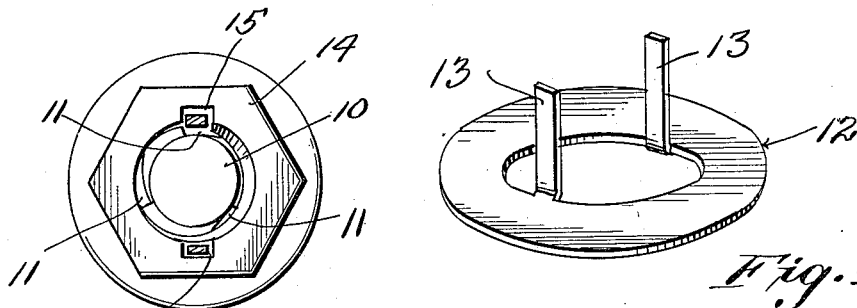
Fig. 3.
Fig. 4.
Witnesses
Inventor
J. K. Major

UNITED STATES PATENT OFFICE.

JOHN K. MAJOR, OF PADUCAH, KENTUCKY.

NUT-LOCK.

1,142,345.  Specification of Letters Patent.  Patented June 8, 1915.

Application filed November 25, 1913. Serial No. 802,997.

*To all whom it may concern:*

Be it known that I, JOHN K. MAJOR, a citizen of the United States, residing at Paducah, in the county of McCracken, State of Kentucky, have invented certain new and useful Improvements in Nut-Locks; and I do hereby declare the following to be a full, clear, and exact description of the invention, such as will enable others skilled in the art to which it appertains to make and use the same.

This invention relates to improvements in nut and bolt locks.

The principal object of the invention is to provide a locking washer of simple construction which will coöperate with the nut and bolt to prevent retrograde movement of the nut.

Other objects and advantages will be apparent from the following description, when taken in connection with the accompanying drawings.

In the drawings: Figure 1 is an elevation of a bolt and nut showing my invention. Fig. 2 is a longitudinal sectional view therethrough. Fig. 3 is a vertical transverse sectional view on the line 3—3 of Fig. 1. Fig. 4 is a perspective view of the washer.

Referring particularly to the accompanying drawings, 10 represents a bolt having the longitudinal ratchet grooves 11. Disposed on the bolt is a washer plate 12, from the inner peripheral wall of which extend the spring fingers 13. These fingers are bent to extend from the face of the washer at right angles thereto, and are arranged to engage with the longitudinal ratchet grooves 11 of the bolt. The nut 14 has formed therethrough, in diametrically opposite points of the wall of the threaded opening, the grooves 15 which receive the beforementioned spring fingers 13. The washer, by the engagement of the fingers in the grooves of the nut will rotate with the nut, and by reason of the depth of the said grooves, the fingers 13 will be permitted to ratchet over the grooves 11, in the direction of rotation of the nut when screwing the same home. The vertical walls of the grooves will be engaged by the spring fingers, or at least one of them and prevent retrograde movement of the nut.

It will be noted that the opening through the washer is larger than the opening through the nut, so that the washer will freely rotate on the bolt and permit the fingers to spring into and out of the grooves of the bolts. In the form shown, the bolt has three grooves, and as the nut rotates with the washer, one of the fingers 13 will be disposed within one of the grooves, while the opposite finger will be pressed against the threads at the diametrically opposite side of the bolt. When an even number of grooves are used, as for instance two or four, both of the spring fingers will either be in the opposite grooves or engaging the thread at the same time.

From the foregoing, it will readily be seen that I have provided a simple and cheap nut lock and one in which the locking element also serves the purpose of a washer. It will also be noted that the tighter the nut forces the washer against the work, the deeper into the grooves of the bolt the fingers will be forced.

What is claimed is:

In a nut lock, the combination with a bolt having a pair of longitudinal ratchet grooves formed in the shank thereof, and a nut having a pair of grooves formed therein and communicating with the bore of the nut, of a washer plate having a pair of resilient fingers projecting therefrom at points adjacent the opening of the washer, one of said fingers being adapted to engage with one of the grooves in the shank of the bolt, and the other of said fingers being adapted to frictionally engage with the threads of the bolt when the bolt, washer and nut are assembled.

In testimony whereof, I affix my signature, in the presence of two witnesses.

JOHN K. MAJOR.

Witnesses:
C. B. CROSSLAND,
M. R. MASON.

Copies of this patent may be obtained for five cents each, by addressing the "Commissioner of Patents, Washington, D. C."